United States Patent
Zogg

Patent Number: 5,933,464
Date of Patent: Aug. 3, 1999

[54] BITWISE SOFT DECISION SYMBOL DECODER

[75] Inventor: Scott J. F. Zogg, Cedar Rapids, Iowa

[73] Assignee: Rockwell International Corporation, Costa Mesa, Calif.

[21] Appl. No.: 08/974,664

[22] Filed: Nov. 19, 1997

Related U.S. Application Data

[63] Continuation of application No. 08/407,545, Mar. 20, 1995.

[51] Int. Cl.$^6$ ....................................................... H03D 1/00
[52] U.S. Cl. ............................................. 375/343; 375/208
[58] Field of Search .................................... 375/200, 206, 375/207, 208, 316, 340, 343; 364/724.11

[56] References Cited

U.S. PATENT DOCUMENTS

| | | | |
|---|---|---|---|
| 4,404,674 | 9/1983 | Rhodes | 371/43 |
| 5,293,398 | 3/1994 | Hamao et al. | 375/200 |
| 5,305,349 | 4/1994 | Dent | 375/200 |
| 5,396,515 | 3/1995 | Dixon et al. | 375/208 |
| 5,764,690 | 6/1998 | Blanchard et al. | 375/206 |

Primary Examiner—Chi H. Pham
Assistant Examiner—Bryan Webster
Attorney, Agent, or Firm—Kyle Eppele; James P. O'Shaughnessy

[57] ABSTRACT

A system for adaptively determining a bitwise weighting factor for coded binary data comprising a correction unit that provides an overall weighting factor representative of the sum of the products of the individual symbol probability factor times the bit value.

3 Claims, 5 Drawing Sheets

BITWISE SOFT DECISION SYMBOL DECODER

This application is a Continuation of application Ser. No. 08/407,545, filed on Mar. 20, 1995.

FIELD OF THE INVENTION

The present invention relates generally to signal processing and more particularly to the processing of coded data signals.

BACKGROUND OF THE INVENTION

Spread spectrum communications involve using more bandwidth than is theoretically needed to transmit digital data. Motivation for using spread spectrum signals is generally based upon interference suppression, energy density reduction or time delay measurement. Direct sequence, pseudonoise, frequency hopping, time hopping and linear frequency modulation are generic types of spread spectrum signals which may be used alone or in combination with each other dependent upon user requirements and system capacity.

In many spread spectrum systems several binary bits are transmitted together in symbols. These symbols may be CCSK, Walsh or others. Often data will be encoded by an error correction code. The correction code has increased accuracy if an estimate of the certainty of bit or symbol decisions are factored into the processing of data. Error correction codes which use this certainty estimate are called soft decision codes.

A matched filter, typically a correlator, provides at its output port the maximum possible peak-signal power/average-noise power ratio when the input is a known signal and a random noise component. Matched filters are implemented in a variety of elements and may be periodic, non-periodic, autocorrelated, or cross-correlated. Implementations may reflect dedicated circuitry for each correlator and associated devices or may be accomplished through adaptive techniques.

Prior art correlators operate by assigning a weighting factor to received signals predetermined and dependent upon, the detected deviation between received packets of coded information often referred to as symbols. This interrelationship between symbols is then used indiscriminately in assigning a soft decision weighting value to all binary bits in a symbol. Unfortunately, weighting all bits in a symbol the same value often results in inaccurate processing of signals due to inappropriate weighting factors being assigned individual bits.

Accordingly a new method of processing coded signals is mandated that allows increased precision of weighting of individual bits and resultant improved accuracy of coded symbol processing.

SUMMARY OF THE INVENTION

The present invention constitutes a system for processing coded signals that is based on adaptive weighting factors cummulatively devised from a bit by bit comparison of selected processed signals. In accordance with the system of the present invention a received signal is detected and the transmitted data removed from the carrier signal. The transmitted data is in coded format, such as CCSK or Walsh, and as such requires correlation in order to accurately interpret its content. The correlation value for each legal symbol value is determined. The correlation values are weighted in decreasing value order and an individual weighting factor assigned to each corresponding symbol value. The individual data bits are then analyzed, with regard to the symbol weights to determine an overall weighting factor for each bit. In this manner, individual bit weights are more accurately determined. Incorrect bits within a symbol are more likely to have their weighting factors reduced. Similarly, correct data bits are more likely to have their overall weighting factor increased.

In one embodiment of the present invention an RF receiver having a single correlator programmed to process CCSK data is described in detail. The correlator output signal is coupled to a bitwise soft decision correction unit that is implemented in a single integrated circuit. The bitwise soft decision correction unit is comprised of a logic component coupled to symbol registers and additional memory, such as a RAM component. The logic unit identifies the correlation representative of the highest correlated symbol values and uses the correlation values in assigning addresses into the RAM. For each input address, the RAM has been loaded with data representing the probabilities that each of the symbol values are correct. The bitwise soft decision unit also stores an associated symbol value with each correlation value into symbol registers. Adders, within the bitwise soft decision unit calculate the probability that each bit is a predefined discrete value, such as a "1". This is done by summing all probabilities assigned to each symbol value by a positional bit-by-bit method. The results is an overall weighting factor of each individual bit location reflective of the relative predetermined probabilities of each symbol value assigned by the RAM.

Alternate embodiments include the use of a plurality of correlators that operate in conjunction with summer and dividers thereby providing an averaged signal to the bitwise soft decision unit. Additional variations include truncating the correlation value increasing operating speed and reducing hardware with minimal accuracy degradation.

It is an object of the present invention to provide increased accuracy of processing coded data.

It is a feature of the present invention to expand the weighting factors assigned in a predetermined "hard" decision technique.

It is an advantage of the present invention to determine an adaptive cumulative weighting factor for individual bits of a data package by weighting probabilities of each symbol value relationships.

These and other objects, features and advantages are disclosed and claimed in the specification, figures and claims of the present application.

BRIEF DESCRIPTION OF THE DRAWINGS

FIGS. 2A–2C illustrate a representative coded digital symbol, digital symbol correlation value, and symbol set, respectively;

DESCRIPTION OF THE PREFERRED EMBODIMENT

Figure 1:
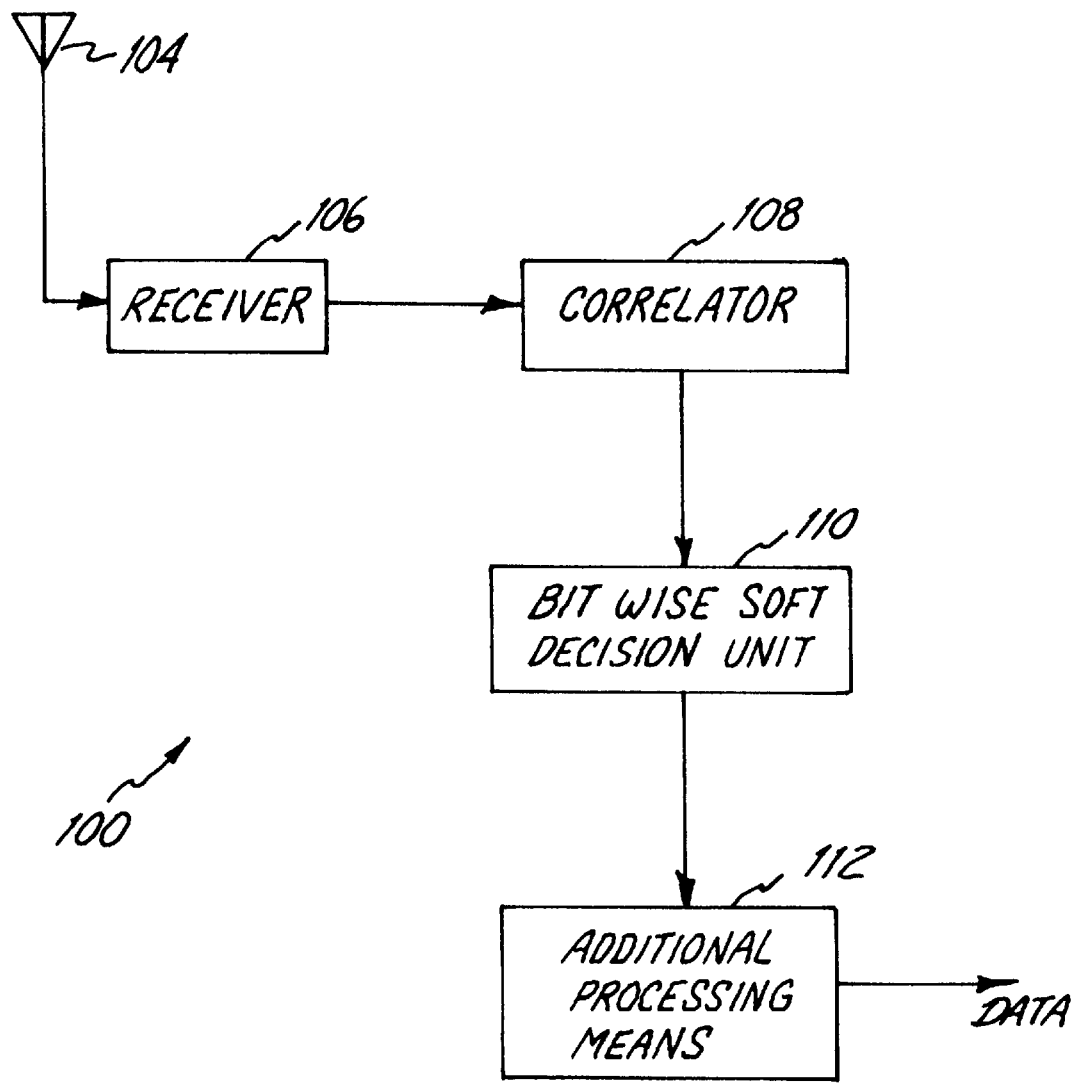
FIG. 1 illustrates a block diagram of a radio system that incorporates the teachings of the present invention.

Referring now to the drawings, wherein like items are referenced as such throughout, FIG. 1 illustrates a radio receiver 100 incorporating the teachings of the present invention. It should be noted that the teachings of the present invention are not limited to broadcast signals but rather to coded data irrespective of its method of transmission to the end-user. As shown receiver 100 is depicted as an RF receiver configured for processing CCSK data, however, that the present invention is not limited to any specific coding technology. An antenna 104 for receiving a desired signal (not shown) is coupled to an RF receiver 106 which derives a selected carrier signal and provides such signal to a demodulator/correlator unit 108. The demodulator/correlator unit 108 removes the coded data from the carrier signal and provides such data to a bitwise soft decision unit 110 for determination of adaptive weighting factors. The bitwise soft decision unit 110 performs data analysis on the individual data bits of the coded CCSK symbols and couples the resultant signal values to additional processing means 112 which performs predetermined processing to yield the desired data.

Figures 2A, 2B, 2C:
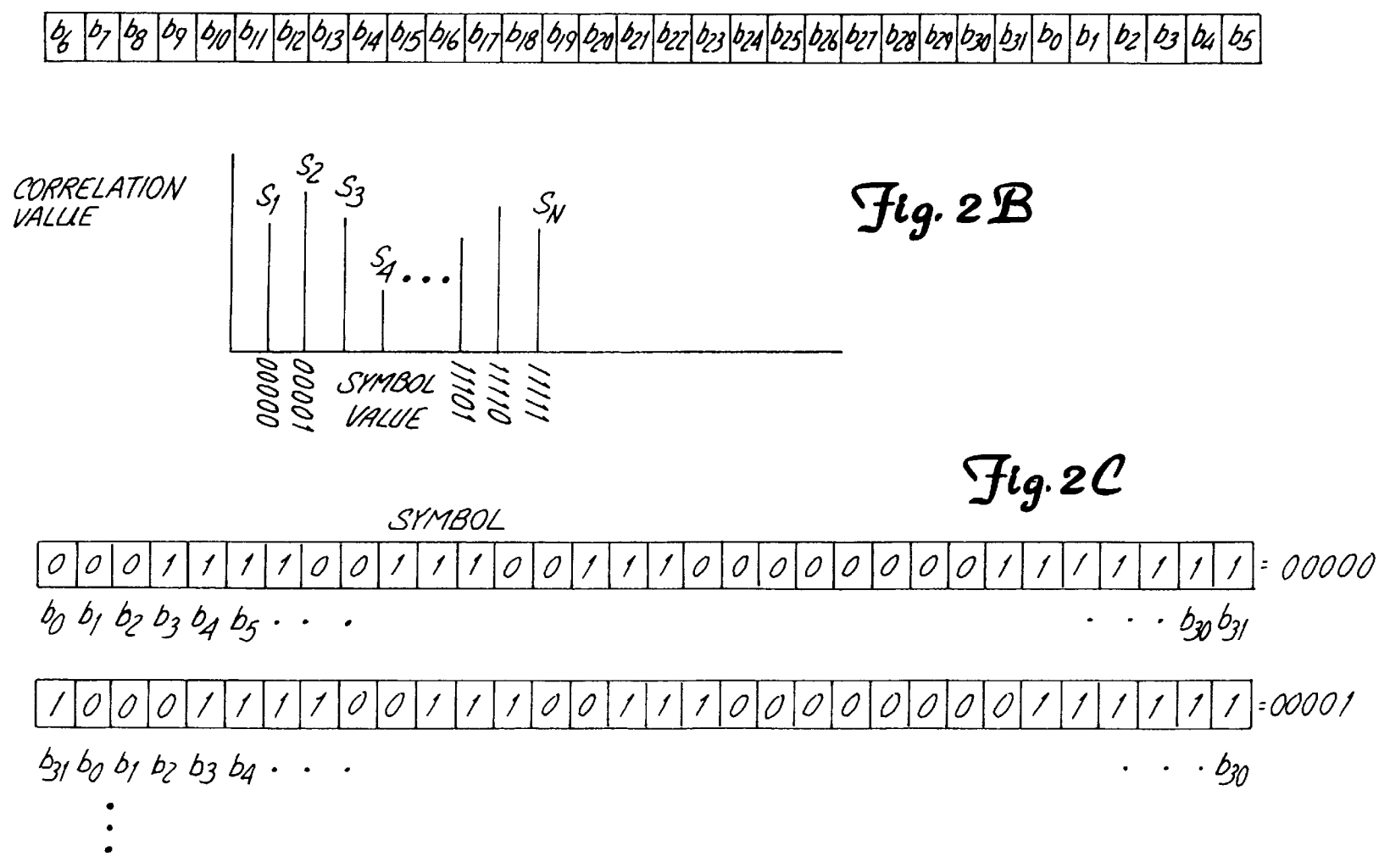

Turning now to FIGS. 2A–2C, representative data packets of CCSK coded signals are presented. Specifically, FIG. 2A illustrates a 32 chip CCSK digital symbol comprised of binary ones and zeroes strategically arranged so that upon proper decoding an abbreviated data point is conveyed. As shown in FIG. 2A the abbreviated data point is 00110. Similarly, FIG. 2B illustrates a two dimension plot of correlated values of coded symbols, wherein each spike $S_1$, $S_2$, through Sn represents the correlation of the received data package corresponding to each legal symbol value described in FIG. 2C. Finally, FIG. 2C is a tabular example of coded symbol relationship between specific transmitted chips and the desired data.

Figure 3:
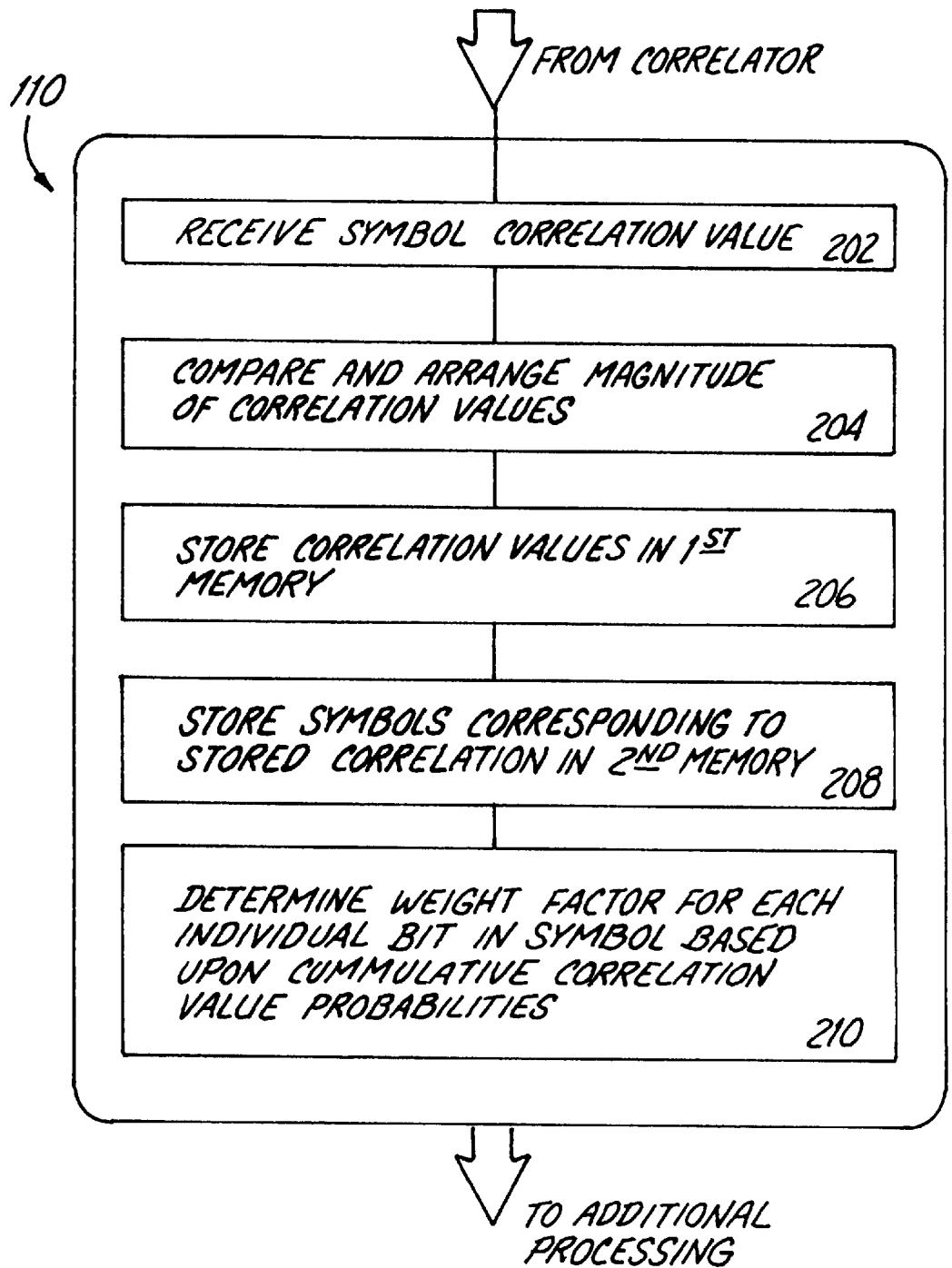
FIG. 3 illustrates a high level block diagram of a single correlator embodiment of the bitwise decision correction unit of FIG. 1.

In prior art solutions, the largest correlation magnitude was identified, and the difference between the largest magnitude and the second largest magnitude was determined. These values were then used to assign the same weighting factor to each bit in a symbol. This technique often results in inaccurate weighting factors for individual data bits within a symbol, which may be the same or different than the data bits in the next most likely symbol value. FIG. 3 illustrates a flow diagram of the bitwise soft decision unit 110 depicted in FIG. 1. The bitwise soft decision unit 110 includes modules 202–210 which process individual data pulses that are representative of coded symbols and ultimately yields a weighting factor for each bit of a coded symbol. It should be understood that the bitwise soft decision unit 110 preferably constitutes a logic device, such as a application specific integrated circuit configured for such application. It should be similarly understood that the modules 202–210 could be implemented in software routines which would provide the signal processing functions described herein.

The module 202 receives the input signal from the correlator 108 (see FIG. 1) which is a correlation value for each symbol value, reflective of the graphical depiction of FIG. 2B. The module 204 compares and arranges each received symbol correlation in a predetermined fashion, such as descending order. Module 206 stores the correlation values as ordered in module 204. The individual symbol values corresponding to the correlation values are stored in module 208, and a cumulative weighting factor is assigned to each individual bit of the symbol 210.

A representative example of the above disclosure will now be described to provide additional understanding of the teachings of the present invention. For purposes of the example a symbol comprising m bits (assume m=4) is transmitted as b chips (where b=16). A weighting factor is assigned to each bit representative of the probability that that bit is a "1". For purposes of the example assume the three highest symbol correlation values are assigned a weighting factor of 50%, 30% and 20%. Such assumption equates to a 50% chance the largest symbol is the correct symbol, a 30% chance the next largest received correlation represents the correct symbol, and a 20% chance that the third largest correlation represents the correct symbol. Assume that the three largest correlator's symbol values are characterized by the following respective data streams, (1110); (0110); (0011). A bit location cumulative weighting factor is then obtained for each bit in accordance with the following principal:

Probability nth bit is a "m" is determined by summing the individual products of the nth bit position for each chip by the respective chip weighting factor, using the above values, Probability 1st bit is a "1":
(1)×50%+(0)×30%+(0)×20%=50%

Probability 2nd bit is a "1":
(1)×50%+(1)×30%+(0)×20%=80%

Probability 3rd bit is a "1":
(1)×50%+(1)×30%+(1)×20%=100%

Probability 4th bit is a "1":
(0)×50%+(0)×30%+(0)×20%=0%

It should be noted that in general, the probabilities for first three symbol values will not sum to 100%. Overall bit accuracy can be increased by including the probability of each legal symbol value in the probability calculation. However, the increased expense in time and material would indicate that an extremely accurate weighting factor can be achieved with considerably less than all bit values utilized in the cumulative calculation. For instance, selection of the three highest correlation values as determined in module 206 would yield significantly more accurate data decoding than prior art systems based solely on the highest correlation value and the distance between the highest and 2nd highest correlation values. Additional economies could be realized by truncating correlation values to some predetermined level and might even be accomplished by truncating differences between subsequent correlation values at a given level. This would allow tremendous reduction in memory while minimizing the effect to overall accuracy.

Figure 4:
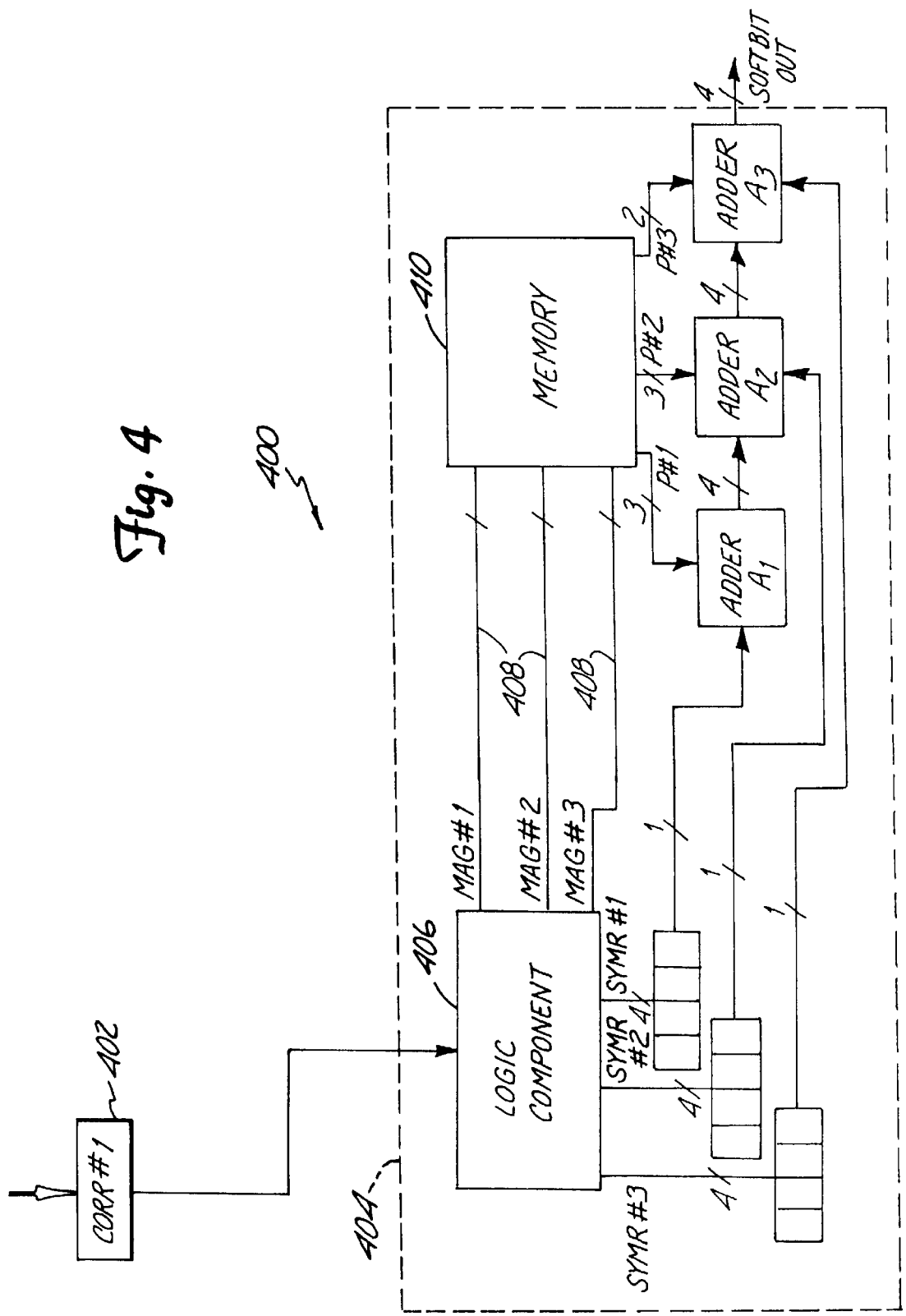
FIG. 4 illustrates a block diagram of a single correlator embodiment of the present invention.

Referring now to FIG. 4 a single correlator system 400 is shown which illustrates one embodiment of the teachings of the present invention. A correlator 402 is coupled to a bitwise soft decision unit 404, having a logic component 406. The logic component 406 determines the correlation value associated with each symbol value and couples each value to a memory component 410, via address lines 408. The memory component 410, (RAM or ROM) stores the associated value in registers that correspond to predetermined weighting factors, $P_1$ through $P_n$. The logic unit 406 is also coupled to symbol registers $SYMR_{1-N}$ which stores each symbol value corresponding to the largest correlation values. The RAM 410 and the Symbol Registers are coupled to adders $A_1$ through $A_n$ which perform the cumulative weighting factor in accordance with the above described theory. It should be noted that the probability factors could be reprogrammed, reflecting different weighting factors consistent with estimated probability deviation. Changing these weighting factors could improve performance in various specific types of interferences or propagation channels.

Figure 5:
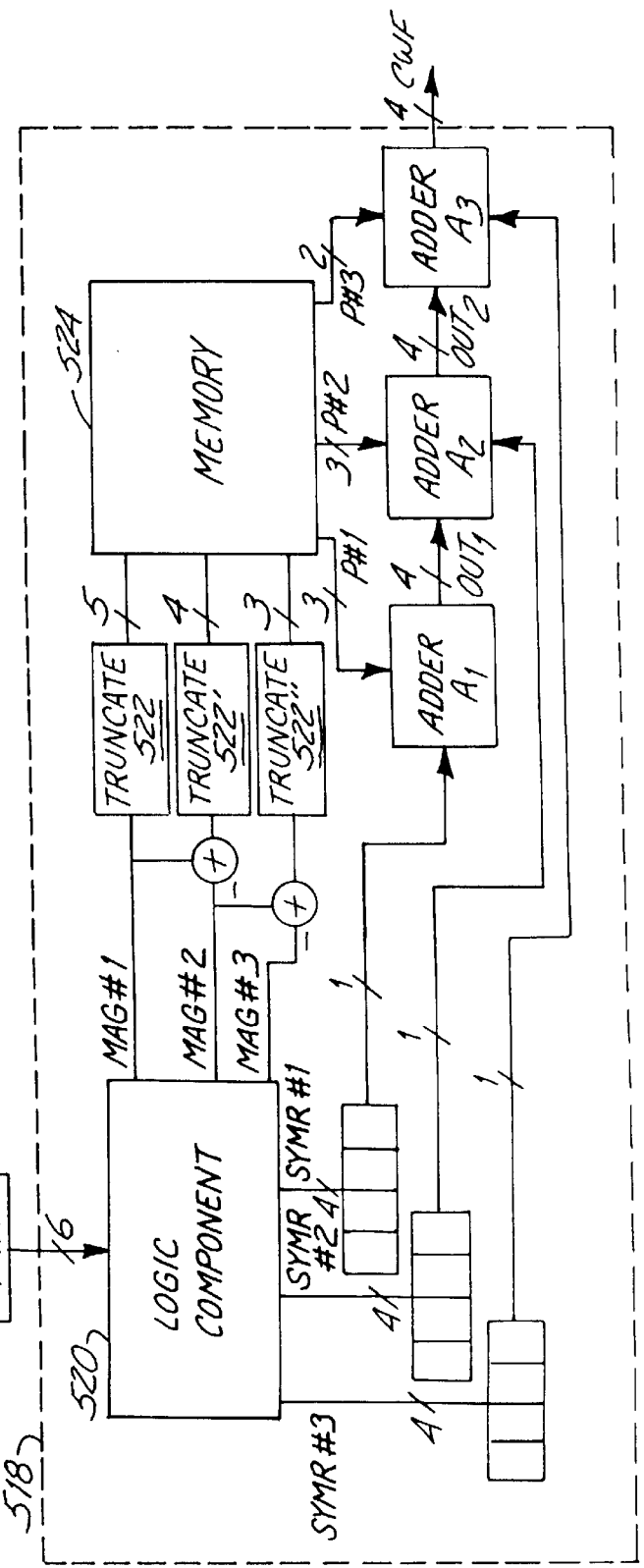
FIG. 5 illustrates a block diagram of a multi-correlator with truncation embodiment of the present invention.

Referring now to FIG. 5 a multi-correlator system 500 is shown having truncation of symbol values of descending weighting factor values. Three correlators 502, 504, and 506 each generate correlated symbols for coded data received on separate frequencies $f_{1-3}$. It should be understood that a multi-correlator system can be made up of any number of correlators. Here three are shown for illustration. The output of the correlator 502 is directly coupled to a multiplexer 516. The output signal of correlator 504 is added to the signal of the correlator 502 via an adder 508, coupled to, and averaged by, a divider 512 and subsequently coupled to the multiplexer 516. The output signal of correlator 506 is coupled with the output signals of correlators 502 and 504, within an adder 510 and averaged by a divider 514, and then coupled to the multiplexer 516. The multiplexer 516 receives a control signal CS which establishes single pulse, double pulse or triple pulse mode depending upon the operating mode of the receiver (not shown).

A bitwise soft decision unit 518 receives the correlated signal of the multiplexer 516, within its logic component 520. The logic unit 520 determines the correlation value associated with each symbol value and couples each correlation value to memory component 524. It should be noted that the absolute values of the correlated digital symbol may be differenced thereby minimizing the digital representation and necessary memory for accomplishing the weighting factor. Similarly, the difference in magnitude of a fixed number of digital symbols may be utilized thereby requiring less memory. In a similar fashion, a threshold value k may be established, above which any digital symbol is truncated. This truncated value retains accuracy of the measured value while minimizing speed and memory requirements. The three largest correlation values are coupled to truncators 522, 522', 522" and subsequently coupled to a memory 524. The largest correlation value is truncated to threshold level k and used as address lines to the memory 524. With the knowledge that the value of the second largest correlation value is less than the largest value, and knowing the largest value, the difference in the largest and second largest correlation values also used as address lines to the memory 524. A similar process is repeated for each successive value stored, truncation being justified by the decreasing magnitude in the difference between successive correlation values. It is also worth noting that an alternate technique could be utilized, such as ascending order differences with appropriate weighting factors provided for respective memory locations.

The memory 524 output signals represent the probabilities that each of the three symbols (stored in $SYMR_{1-3}$) with the three largest correlation values are the correct symbol. These respective probabilities are then rounded in a predetermined fashion, such as to the nearest one-eighth. Thus, the probability that the third largest correlation represents the correct symbol will never be greater than one-third, therefore the third symbol only requires two bits to represent the probabilities from zero to three-eighths. The probability that the rotation with the largest correlation is the correct rotation is represented by $P_1$. $P_1$ is a three bit integer which represents probabilities from one-eighth to eight-eighths. The probability that the rotation with the second largest correlation is the correct rotation is represented by $P_2$. $P_2$ is a three bit integer which represents probabilities from zero to seven-eighths, although theoretically, no probability greater than one half should be utilized. The probability that the rotation with the third largest correlation is the correct rotation is represented by $P_3$. $P_3$ is a two bit integer which corresponds to probabilities between zero and three-eighths.

The logic unit 520 is coupled to symbol storage registers $SYMR_1$, $SYMR_2$, $SYMR_3$ which correspond to address locations $P_1$ through $P_3$ within the RAM 524. In the given example, the symbols are four bits long and are sequentially shifted out of the registers $SYMR_{1-3}$ and used to control the weighting value. The MSB is the first bit to be shifted out and the LSB is the last information utilized. Adders $A_1$ through $A_3$ are coupled to the RAM 524 and the symbol registers $SYMR_{1-3}$, and implement the following relationships:

If the bit from $SYMR_1$ is a 1 then, $Out_1 = 8 + P_1$.
If the bit from $SYMR_1$ is a 0 then, $Out_1 = 7 - P_1$.
If the bit from $SYMR_2$ is a 1 then, $Out_2 = Out_1 + P_2$.
If the bit from $SYMR_2$ is a 0 then, $Out_2 = Out_1 - P_2$.
If the bit from $SYMR_3$ is a 1 then, $CWF = Out_2 + P_3$.
If the bit from $SYMR_3$ is a 0 then, $CWF = Out_2 - P_3$.

$Out_1$ = output weighting factor from largest correlation
$Out_2$ = output weighting factor from second largest correlation
Where CWF = cumulative weighting factor The output signal CWF of the unit 518 is highly accurate because of the inter-chip and intra-bit cumulative weighting factor utilized, as contrasted to prior art systems.

While particular embodiments of the present invention have been shown and described, it should be clear that changes and modifications may be made to such embodiments without departing from the true spirit of the invention. It is intended that the appended claims cover all such changes and modifications.

I claim:

1. A system for processing coded data comprising:
    a correlator that generates signal pulses for each correlation magnitude of interest
    a bitwise soft decision unit coupled to the correlator signal pulses, comprising:
    a logic unit component said logic component having as its input, the correlator signal pulses;
    a plurality of truncators disposed between the logic component and the memory component means for reducing the number of bits for each generated signal pulse;
    a memory component for storing the correlation values in systematic order thereby assigning a unique weighting factor for each symbol value said memory component having as its input, output signals from the logic component;
    a plurality of registers, coupled to said logic component, said registers receiving as an input signal said correlation signal pulse; and
    a plurality of adders coupled to output signals of said memory component and said plurality of registers that sum the product of each positional bit unique weighting factor thereby yielding an adaptive weighting factor for each bit positional location in a symbol.

2. The system of claim 1 wherein the logic component includes a threshold level value of such magnitude that any correlation value in excess of the threshold value is stored as the threshold level value.

3. The system of claim 1 wherein the memory component stores the three largest correlation values and the unique weighting factors assigned to the correlation values having the three largest magnitudes range in accordance with the following:

| | |
|---|---|
| largest correlation | 0–100% |
| second largest | 0–50% |
| third largest | 0–33.3%. |

\* \* \* \* \*